March 11, 1958 — R. R. CONELL — 2,826,230
POCKET HOLDER FOR TISSUE
Filed March 7, 1955
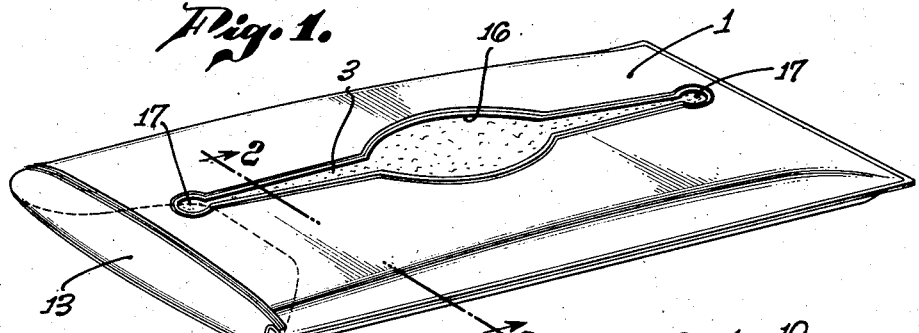
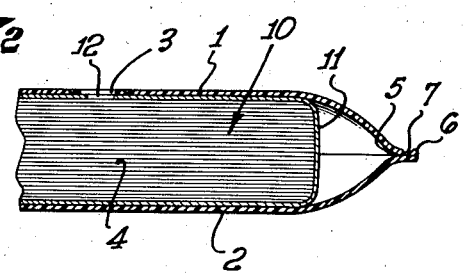
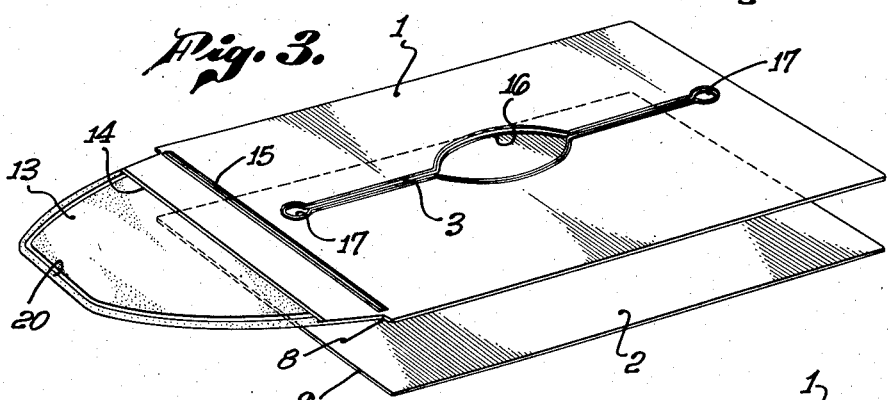
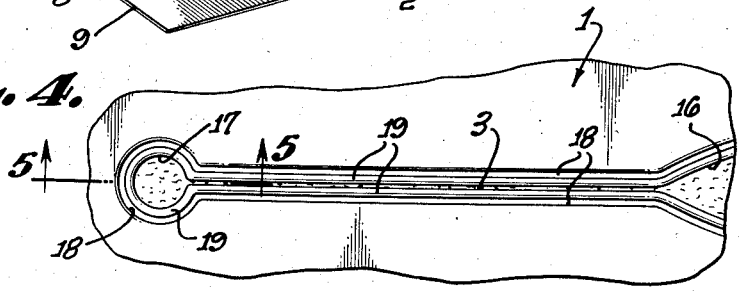
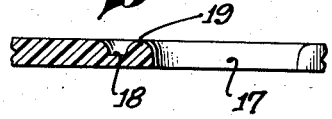
INVENTOR.
RALPH R. CONELL,
BY
*Flam and Flam*
ATTORNEYS.

United States Patent Office 2,826,230
Patented Mar. 11, 1958

2,826,230

POCKET HOLDER FOR TISSUE

Ralph R. Conell, Los Angeles, Calif.

Application March 7, 1955, Serial No. 492,459

1 Claim. (Cl. 150—52)

This invention relates to a holder for sheets of tissue, adapted to be carried in the pocket or a purse.

Packages of folded and interleaved sheets of tissue are now a common commodity. Such sheets are provided for personal use, and often serve, for example, as a substitute for handkerchiefs.

It is one of the objects of this invention to provide a simple and inexpensive holder for such packages, preferably made from flexible plastic material.

It is another object of this invention to provide a holder of this character that serves also as a dispenser, as by the provision of a slit through which the tissue sheets may be withdrawn.

This invention possesses many other advantages, and has other objects which may be made more clearly apparent from a consideration of one embodiment of the invention. For this purpose, there is shown a form in the drawings accompanying and forming part of the present specification. This form will now be described in detail, illustrating the general principles of the invention; but it is to be understood that this detailed description is not to be taken in a limiting sense, since the scope of this invention is best defined by the appended claim.

Referring to the drawings:

Figure 1 is a perspective view of a holder incorporating the invention;

Fig. 2 is an enlarged fragmentary view, taken along a plane corresponding to line 2—2 of Fig. 1;

Fig. 3 is a perspective view illustrating the separate front and back members, prior to their attachment;

Fig. 4 is an enlarged fragmentary plan view of the front member of the holder; and Fig. 5 is an enlarged sectional view, taken along a plane of line 5—5 of Fig. 4.

The holder comprises the front member 1 and a back member 2. Both of these members are made of thermoplastic material, such as a vinyl. It is made relatively thin so as to be quite flexible.

The configuration of both members 1 and 2 is generally rectangular or four-sided, and are similar. The front member has a slit 3 therein for the withdrawal of sheets of tissue 4 (Fig. 2), as they may be needed.

To assemble the device into a pouch form, all but one of the edges of the front and back members 1 and 2 are thermally welded as by heated press. Such a weld 5 along one of the edges is indicated in Fig. 2.

A rib 6 is formed around the three attached edges by the welding operation, to lend definite shape to the holder. Any three of the edges may be so attached. This can readily be accomplished by impressing a crease or groove 7 during the welding operation, close to the attached edges.

In the present instance, the unattached edges 8 and 9 are the shorter ones (Fig. 3), and are utilized to form an opening for the insertion of a tissue pack 10 for the sheets 4. This tissue pack 10 usually has a cover or envelope 11. The upper wall of this cover envelope may be provided with a slit 12 for permitting withdrawal of the tissues 4.

In order to close the opening formed by the edges 8 and 9, one of the members, such as the front member 1, is provided with an integral tongue or flap 13 which may be folded underneath the pack 10, as indicated in Fig. 1. This flap 13 is provided with a crease or groove 14 parallel to the edges 8 and 9 to facilitate folding of the flap. This groove may be extended around the free edges of the flap 13 to define a rib 20. This rib 20 may be purposely made rough, as by the aid of the welding die, to provide additional friction, resisting inadvertent removal of the flap after insertion into the holder. In fact, the entire area of the flap 13 may be so roughened. Crease 15 of similar form is provided adjacent the base of the flap 13.

The flap 13 is disposed beneath the lowermost sheet 4, and thus prevents the pack 10 from falling out.

Due to the inherent tendency of pack 10 to expand, the flap 13 is urged by the pack against the inner surface of back 2. The frictional resistance against inadvertent removal of the flap is thus increased.

The slit 3 has an elliptical enlarged portion 16. This makes it possible to grasp the top-most tissue sheet when it is desired to withdraw it through the slit 3. Furthermore, since the insertion of the pack 10 causes a slight bulging of the members 1 and 2, the sides of the slit are separated slightly, as indicated in Fig. 1. This provides for more ready withdrawal of the tissue sheet.

For reenforcing the edges of the slit 3 and to cause it to resist tearing, circular enlarged end portions 17 are provided for the slit 3. Extending completely around all of the edges of the slit 3, a groove 18 is provided, shown most clearly in Fig. 5. This forms a rib 19 serving to strengthen the slit edges.

The holder is sufficiently small to be carried in the pocket of the user, or in a purse. The plastic material from which the holder is made is capable of long wear, and the manner of constructing the device is simple.

The inventor claims:

In a holder for a pack of tissue sheets; a front member of generally four-sided form; a back member of substantially the same configuration as the front member; said members being made of flexible thermoplastic material and attached together only at three of the edges of the members, the other edges of the front and back members defining an opening for access to the space between the members; the front member having a slit in its front face; and a flap integrally formed at an unattached edge of one of the members, to form a closure; said flap having a groove to form a rib parallel to the unattached edges; said flap also having a groove forming a rib around the flap edges; said flap having a roughened exterior surface capable of creating friction between it and the inner surface of one of the members.

References Cited in the file of this patent

UNITED STATES PATENTS

| | | |
|---|---|---|
| D. 159,753 | Pelton | Aug. 15, 1950 |
| 578,552 | Ebersold | Mar. 9, 1897 |
| 1,681,611 | Hansen | Aug. 21, 1928 |
| 1,693,591 | Chatillon | Dec. 4, 1928 |
| 1,963,190 | Berkowitz | June 19, 1934 |
| 2,474,784 | Golden | June 28, 1949 |
| 2,522,126 | Kotkins | Sept. 12, 1950 |
| 2,541,933 | Nail | Feb. 13, 1951 |
| 2,574,345 | Montgomery | Nov. 6, 1951 |
| 2,587,033 | Dobbs et al. | Feb. 26, 1952 |
| 2,633,618 | Moe | Apr. 7, 1953 |
| 2,685,550 | Corey | Aug. 3, 1954 |
| 2,735,797 | Schjeldahl | Feb. 21, 1956 |